United States Patent
Sharifi et al.

(10) Patent No.: US 9,928,840 B2
(45) Date of Patent: *Mar. 27, 2018

(54) HOTWORD RECOGNITION

(71) Applicant: Google Inc., Mountain View, CA (US)

(72) Inventors: Matthew Sharifi, Kilchberg (CH);
Jakob Nicolaus Foerster, Oxford (GB)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/176,830

(22) Filed: Jun. 8, 2016

(65) Prior Publication Data

US 2017/0110130 A1   Apr. 20, 2017

Related U.S. Application Data

(63) Continuation of application No. 15/176,482, filed on Jun. 8, 2016, which is a continuation of application No. 14/943,287, filed on Nov. 17, 2015.

(Continued)

(51) Int. Cl.
*G10L 21/00* (2013.01)
*G10L 15/00* (2013.01)
(Continued)

(52) U.S. Cl.
CPC .......... *G10L 17/02* (2013.01); *G10L 15/1815* (2013.01); *G10L 15/285* (2013.01); *G10L 25/51* (2013.01); *G10L 2015/088* (2013.01)

(58) Field of Classification Search
CPC . G10L 15/22; G10L 2015/223; G10L 15/265; G10L 17/22; G10L 15/00; G10L 17/005; G10L 15/32

(Continued)

(56) References Cited

U.S. PATENT DOCUMENTS 6,330,672 B1 * 12/2001 Shur ................... G06T 1/0028
375/E7.089
6,480,825 B1 * 11/2002 Sharma ............ G07C 9/00158
704/270

(Continued)

FOREIGN PATENT DOCUMENTS

EP           0533396        3/1993
JP           H11-231895     8/1999

(Continued)

OTHER PUBLICATIONS

Wei Shang et al. "Score normalization in playback attack detection," Acoustics Speech and Signal Processing (ICASSP), Mar. 2010, 4 pages.

(Continued)

*Primary Examiner* — Edgar Guerra-Erazo
(74) *Attorney, Agent, or Firm* — Fish & Richardson P.C.

(57) ABSTRACT

Methods, systems, and apparatus, including computer programs encoded on a computer storage medium, for receiving audio data corresponding to an utterance, determining that the audio data corresponds to a hotword, generating a hotword audio fingerprint of the audio data that is determined to correspond to the hotword, comparing the hotword audio fingerprint to one or more stored audio fingerprints of audio data that was previously determined to correspond to the hotword, detecting whether the hotword audio fingerprint matches a stored audio fingerprint of audio data that was previously determined to correspond to the hotword based on whether the comparison indicates a similarity between the hotword audio fingerprint and one of the one or more stored audio fingerprints that satisfies a predetermined threshold, and in response to detecting that the hotword audio fingerprint matches a stored audio fingerprint, dis- (Continued)

abling access to a computing device into which the utterance was spoken.

20 Claims, 5 Drawing Sheets

Related U.S. Application Data

(60) Provisional application No. 62/242,650, filed on Oct. 16, 2015.

(51) Int. Cl.

| | | |
|---|---|---|
| *G10L 25/00* | (2013.01) | |
| *G10L 17/02* | (2013.01) | |
| *G10L 25/51* | (2013.01) | |
| *G10L 15/18* | (2013.01) | |
| *G10L 15/28* | (2013.01) | |
| *G10L 15/08* | (2006.01) | |

(58) Field of Classification Search
USPC .... 704/231, 235, 246, 270, 270.1, 271, 275, 704/276, 277
See application file for complete search history.

(56) References Cited

U.S. PATENT DOCUMENTS

| | | | |
|---|---|---|---|
| 6,963,975 | B1 | 11/2005 | Weare |
| 7,444,353 | B1 | 10/2008 | Chen et al. |
| 8,180,765 | B2 | 5/2012 | Nicolov |
| 8,194,624 | B2 * | 6/2012 | Park .................. G01S 5/0205 370/329 |
| 8,411,977 | B1 | 4/2013 | Baluja et al. |
| 8,484,017 | B1 | 7/2013 | Sharifi et al. |
| 8,768,712 | B1 | 7/2014 | Sharifi |
| 9,087,182 | B2 * | 7/2015 | King .................. G06F 21/31 |
| 9,424,841 | B2 * | 8/2016 | Foerster .................. G10L 15/02 |
| 9,747,926 | B2 * | 8/2017 | Sharifi .................. G10L 25/51 |
| 2004/0059922 | A1 | 3/2004 | Harris et al. |
| 2005/0065976 | A1 | 3/2005 | Holm et al. |
| 2007/0055500 | A1 | 3/2007 | Bilobrov |
| 2007/0239675 | A1 | 10/2007 | Ragno et al. |
| 2008/0183757 | A1 | 7/2008 | Dorogusker et al. |
| 2008/0222105 | A1 | 9/2008 | Matheny |
| 2008/0275846 | A1 | 11/2008 | Minas |
| 2009/0164641 | A1 | 6/2009 | Rogers et al. |
| 2010/0070488 | A1 | 3/2010 | Sylvain |
| 2010/0131279 | A1 | 5/2010 | Pilz |
| 2011/0153050 | A1 | 6/2011 | Bauer et al. |
| 2012/0036556 | A1 * | 2/2012 | LeBeau .................. G06F 3/048 726/3 |
| 2012/0059495 | A1 | 3/2012 | Weiss et al. |
| 2012/0209612 | A1 | 8/2012 | Bilobrov |
| 2012/0245941 | A1 | 9/2012 | Cheyer |
| 2013/0117259 | A1 | 5/2013 | Ackerman et al. |
| 2013/0124371 | A1 | 5/2013 | Mehta et al. |
| 2013/0173604 | A1 | 7/2013 | Li et al. |
| 2013/0275952 | A1 | 10/2013 | Dalcher |
| 2014/0310006 | A1 | 10/2014 | Miro et al. |
| 2014/0348308 | A1 | 11/2014 | Krause |
| 2015/0016661 | A1 | 1/2015 | Lord |
| 2015/0279351 | A1 | 10/2015 | Nguyen et al. |
| 2016/0300571 | A1 * | 10/2016 | Foerster .................. G10L 15/02 |

FOREIGN PATENT DOCUMENTS

| | | |
|---|---|---|
| JP | 2002-514318 | 5/2002 |
| JP | 2014-081441 | 5/2014 |
| JP | 2015-079152 | 4/2015 |
| WO | 98/34216 | 8/1998 |

OTHER PUBLICATIONS

Extended European Search Report in European Application No. 16189243.5, dated Jan. 20, 2017, 11 pages.

Faundez-Zanuy M et al. "Speaker Verification security improvement by means of speech watermarking," Speech Communication, Elsevier Science Publishers, Amsterdam, NL, vol. 48.12, Dec. 1, 2006, 12 pages.

Extended European Search Report in European Application No. 16189244.3-1901, dated Jan. 30, 2017, 10 pages.

Extended European Search Report in European Application No. 16188146.1-1901, dated Mar. 20, 2017, 9 pages.

Office Action issued in Japanese Application No. 2016-179290, dated Oct. 16, 2017, 10 pages (with English translation).

\* cited by examiner

HOTWORD RECOGNITION

CROSS-REFERENCE TO RELATED APPLICATION

This application is a continuation of U.S. application Ser. No. 15/176,482, filed Jun. 8, 2016, which is a continuation of U.S. application Ser. No. 14/943,287, filed Nov. 17, 2015, which claims the benefit of U.S. Provisional Application No. 62/242,650, filed Oct. 16, 2015, the contents of each of which are hereby incorporated by reference.

FIELD

The present specification generally relates to speech recognition.

BACKGROUND

Automatic speech recognition is an important technology that is used in computing devices. A speech recognition service for an electronic device generally receives the vocal utterances that include spoken words from a user, and transcribes the spoken words into text. Vocal utterances may include a hotword, i.e., a predetermined reserved word that causes a system or device to perform a corresponding action or actions.

SUMMARY

Implementations of the present disclosure relate to hotword recognition, for example, using a hotword to unlock or enable access to a mobile device via voice, and inhibiting replay attacks. A replay attack is the process by which an unauthorized user captures the audio for a hotword spoken by the device's owner or authorized user, and replays it in order to gain some level of unauthorized access to the device. According to implementations of the disclosure, hotword or any speech-based replay attacks may be inhibited by verifying the uniqueness of each utterance. In particular, the most recent, last N, or all hotword utterances that were recognized for a particular device or for a particular user may be recorded and stored. An audio fingerprint may be generated and stored for each hotword utterance, and a comparison may be performed between the audio fingerprint generated from a new utterance with each previously recorded audio fingerprint to check whether the same utterance audio has been previously used, indicating a replay. In addition, in certain implementations, other signals, e.g., ultrasonic audio injection and cross-utterance verification, may be used to further limit the effectiveness of replay attacks.

One innovative aspect of the subject matter described in this specification is embodied in methods that include the actions of receiving audio data corresponding to an utterance; determining that the audio data corresponds to a hotword; generating a hotword audio fingerprint of the audio data that is determined to correspond to the hotword; determining a similarity between the hotword audio fingerprint and one or more stored audio fingerprints of audio data that was previously determined to correspond to the hotword; detecting whether the hotword audio fingerprint matches a stored audio fingerprint of audio data that was previously determined to correspond to the hotword based on whether the similarity between the hotword audio fingerprint and one of the one or more stored audio fingerprints satisfies a predetermined threshold; and in response to detecting that the hotword audio fingerprint matches a stored audio fingerprint, disabling access to a computing device into which the utterance was spoken.

In general, another aspect of the subject matter described in this specification may be embodied in methods that include the actions of receiving additional audio data corresponding to an additional utterance; identifying speaker-identification d-vectors using the additional audio data; determining a similarity between the speaker-identification d-vectors from the additional audio data and hotword d-vectors from the audio data corresponding to the utterance; detecting whether the audio data corresponding to the hotword matches the additional audio data based on whether the similarity between the hotword d-vectors from the audio data corresponding to the utterance and the speaker-identification d-vectors from the additional audio data satisfies a particular threshold; and in response to detecting that the audio data corresponding to the hotword does not match the additional audio data, disabling access to the computing device.

According to another aspect of the subject matter described in this specification, the hotword may be a particular term that triggers semantic interpretation of an additional term of one or more terms that follow the particular term. The additional term of one or more terms that follow the particular term may be associated with a query or command.

Another aspect of the subject matter described in this specification may be embodied in methods that include the actions of receiving additional audio data corresponding to a voice command or query, and determining a type of the voice command or query. Further, the predetermined threshold may be adjusted based on the determined type of the voice command or query.

These and other implementations may each optionally include one or more of the following features. For instance, determining that the audio data corresponds to a hotword may include identifying one or more acoustic features of the audio data; comparing the one or more acoustic features of the audio data to one or more acoustic features associated with one or more hotwords stored in a database; and determining that the audio data corresponds to one of the one or more hotwords stored in the database based on the comparison of the one or more acoustic features of the audio data to the one or more acoustic features associated with one or more hotwords stored in the database.

In some implementations, determining that the audio data corresponds to a hotword includes determining that an initial portion of the audio data corresponds to an initial portion of the hotword; and in response to determining that the initial portion of the audio data corresponds to the initial portion of the hotword, causing one of a plurality of unique ultrasonic audio samples to be outputted after the initial portion of the audio data is received.

Another aspect of the subject matter described in this specification may be embodied in methods that include the actions of determining that the received audio data comprises audio data corresponding to one of the plurality of unique ultrasonic audio samples; and in response to determining that the received audio data comprises audio data corresponding to one of the plurality of unique ultrasonic audio samples, disabling access to the computing device.

Other implementations of these aspects include corresponding systems, apparatus, and computer programs, configured to perform the actions of the methods, encoded on computer storage devices.

The details of one or more implementations of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
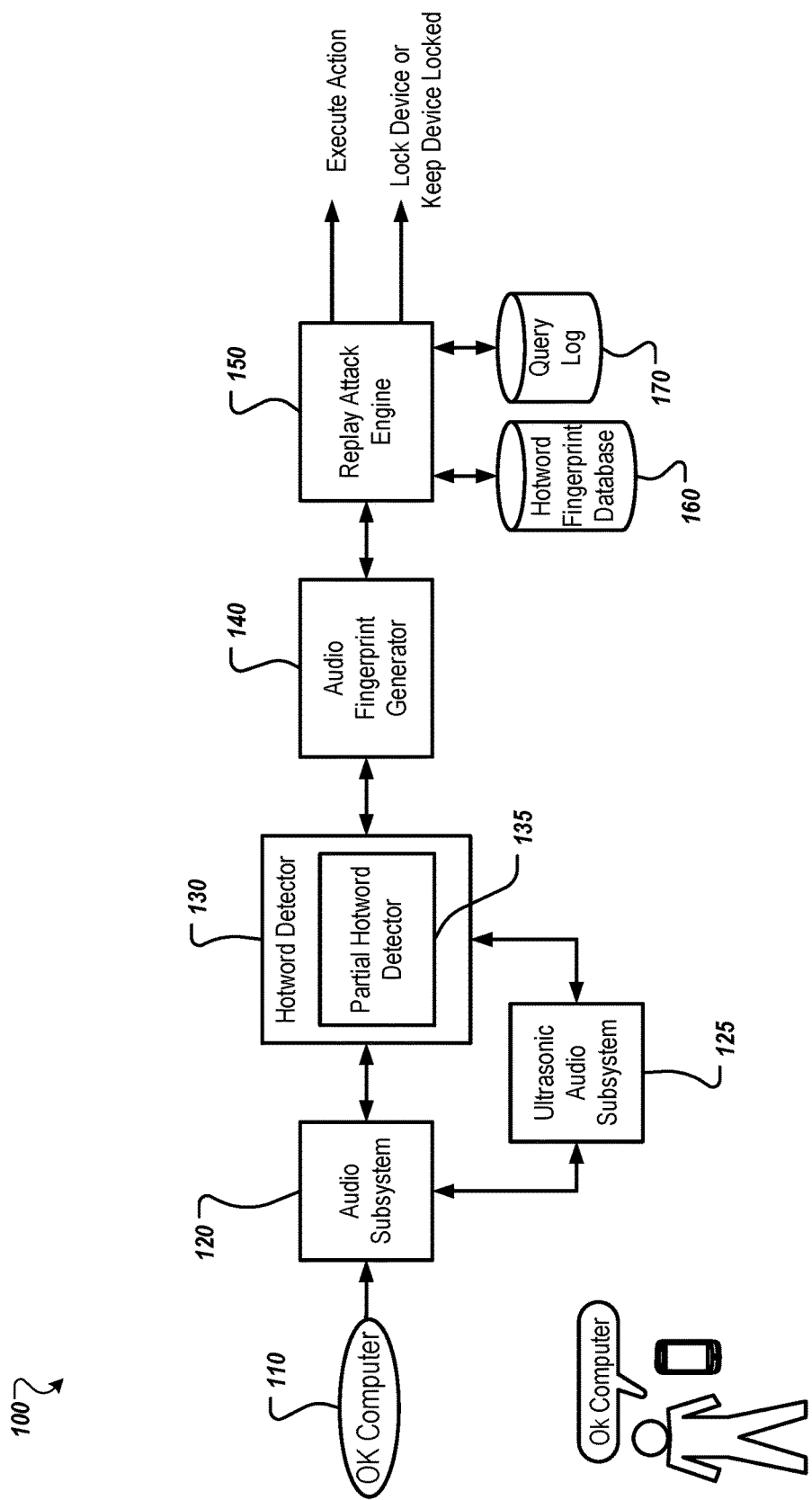
FIG. 1 depicts an example system for detecting and verifying a hotword, according to implementations of the invention.

FIG. 1 depicts an example system 100 for detecting and verifying a hotword, according to implementations of the invention. Such a system 100 may inhibit replay attacks. In some implementations system 100 includes an audio subsystem 120, a hotword detector 130, an audio fingerprint generator 140, and a replay attack engine 150. In some examples, system 100 may be embodied in a computing device, e.g., a smartphone, a laptop computer, a desktop or personal computer, a tablet, or the like, or a combination thereof. The computing device may include any audio detection means, e.g., a microphone, for detecting utterances from a user.

Implementations of the present disclosure enable hotword recognition, for example, using a hotword to unlock or enable access to a mobile device via voice. One way to enable that use of a hotword is through hotword recognition that is always on. Always-on hotword recognition is the process of continuously listening for a predefined phrase, e.g., "OK Computer", in order to wake up a computing device and initiate an activity. One advantage of hotword detection over running a full speech recognizer is that hotword detection allows for highly efficient and robust recognition because only a fixed trigger phrase needs to be recognized. Further, hotword recognition may involve comparing audio features of input speech with audio features of known utterances of a hotword, without performing speech recognition on the input utterance. Such operations may be performed at drastically less computational expense than implementing a speech recognizer.

Because the spoken hotword provides access to the device, the hotword is a particular utterance, and the hotword is spoken aloud, the use of hotword recognition may be susceptible to replay attacks. A replay attack is the process by which an unauthorized user captures the audio for a hotword spoken by the device's owner or authorized user, and replays it in order to gain some level of unauthorized access to the device. According to implementations of the disclosure, hotword or any speech-based replay attacks may be inhibited by verifying the uniqueness of each utterance.

In certain implementations, always-on hotword recognition may be used in combination with speaker verification to filter out utterances that were not spoken by the device's owner. The combination of speaker verification with hotword recognition is advantageous because hotword recognition is text-dependent, i.e., the spoken utterance is the same for a given hotword.

In some implementations, the user may say one or more words that the computing device detects as an utterance. The utterance may include one or more hotwords, or partial hotwords, that cause an action to be performed by the computing device.

In certain implementations, when the computing device is locked, a hotword may act as a way to gain partial or full access to the device. For example, if a user says "OK Computer" when the screen is off and/or the device is locked, and the speaker profile is successfully verified, certain queries may be allowed that access private or sensitive data, such as "when is my next meeting," "send a message to Boss," or the like. In some implementations, a hotword may allow the user to perform voice actions such as "send an email", or may be used to fully unlock the device, particularly when combined with additional contextual signals such as location.

As depicted in the illustrated example, the user may say, for example, "OK Computer." The computing device may detect the utterance "OK Computer" 110 with the audio subsystem 120 appropriately receiving audio data of the utterance "OK Computer" 110.

In the illustrated example, the audio subsystem 120 may receive the audio data associated with the utterance "OK Computer" 110. The received audio data may include a series of audio frames of the utterance, or a predetermined amount of time of the audio data associated with the utterance. In some implementations, the audio subsystem 120 may processes the utterance to generate waveform data that includes a portion of the utterance, or substantially a whole portion of the utterance.

In some implementations, the audio subsystem 120 appropriately may process the received audio data. For example, the audio subsystem 120 may identify one or more acoustic features of the audio data. In the illustrated example, the audio subsystem 120 may identify acoustic features associated with the audio data associated with the utterance "OK Computer."

In some implementations, the audio subsystem 120 may provide the processed audio data to the hotword detector 130. For example, the audio subsystem 120 may provide the processed audio data associated with the utterance "OK Computer" to the hotword detector 130. In some implementations, the processed audio data may include acoustic features associated with the utterance "OK Computer," audio data associated with the utterance "OK Computer," a transcription associated with the utterance "OK Computer," or any combination thereof.

The hotword detector 130 may receive the processed audio data. In the illustrated example, the hotword detector 130 may receive the processed audio data associated with the utterance "OK Computer." The hotword detector 130 may determine that the received audio data corresponds to a hotword. Specifically, the hotword may determine that the audio data corresponds to a hotword. In the illustrated example, the hotword detector 130 may determine that the audio data associated with the utterance "OK Computer" corresponds to the hotword "OK Computer."

In some implementations, the received audio data may include associated acoustic features, e.g., as identified by the audio subsystem 120. The hotword detector 130 may compare the acoustic features of the audio data associated with the utterance "OK Computer" to acoustic features associated with one or more hotwords stored in a database. Specifically, each hotword may be associated with one or more acoustic features, e.g., phonetics of the hotword. A database, or table, may store a mapping between the hotwords and an associated acoustic feature(s). In some implementations, a hotword, may be associated with two or more acoustic features. In some implementations, an acoustic feature may be associated with two or more hotwords.

Based on the comparing of acoustic features, the audio data associated with the utterance "OK Computer" may be determined to correspond to a hotword stored in the database. For example, it is determined that the acoustic features of the audio data associated with the utterance "OK Computer" corresponds to the hotword "OK Computer" based on the comparison of the acoustic features of the utterance "OK Computer" and the acoustic features of the hotword "OK Computer." Exemplary hotword recognition techniques that may be used in accordance with implementations of the present disclosure are described in U.S. Pat. Pub. No. 2015/0279351 A1, which is incorporated herein by reference; and more specifically, the process of FIG. 6, the details of which are depicted in FIGS. 2-5, all of which are incorporated herein by reference.

The hotword detector 130 may provide a result of the determination that the audio data corresponds to a hotword to the audio fingerprint generator 140. Specifically, in the illustrated example, the hotword detector 130 may provide the hotword "OK Computer," or a signal associated with the hotword "OK Computer," to the audio fingerprint generator 140.

The audio fingerprint generator 140 may receive the result of the determination that the audio data corresponds to the hotword from the hotword detector 130. Specifically, in the illustrated example, the audio fingerprint generator 140 may receive audio data that corresponds to the hotword "OK Computer," or a signal associated with the hotword "OK Computer," from the hotword detector 130. The signal may include an indication that the audio data associated with the utterance "OK Computer" corresponds to a hotword.

The audio fingerprint generator 140 may generate a fingerprint of the audio data associated with the utterance of the hotword. In particular, in the illustrated example, the audio fingerprint generator 140 may process the audio data associated with the utterance "OK Computer," which corresponds to a hotword, to generate an audio fingerprint of the utterance "OK Computer."

In some implementations, audio fingerprints may be designed to allow for precise matching in the presence of extreme noise or other distortions such as pitch shifts and time stretches. In addition, each respective audio fingerprint is unique. For example, hotword utterances from the same speaker in the same environmental conditions still have different fingerprints. The audio fingerprint may include any background noise in addition to the spoken utterance.

Any type of audio fingerprint may be used according to implementations of the invention. For example, the audio fingerprint described in: U.S. Pat. No. 8,411,977 B1, which is incorporated herein by reference. The audio fingerprint may provide resistance against noise, pitch and time shifts, which are transformations that may be applied by a replay attacker. The fingerprint may be generated by detecting time-frequency peaks in the audio signal, which may be combined into triples and characterized by frequency ratios to provide invariance to pitch.

Alternatively, other features may be used to generate the fingerprint. For example, the fingerprint may consist of a series of frames of filterbank energies. The series of frames may be normalized and compared with a frame from another utterance using a distance function such as L2 distance. According to another alternative the features used to generate the fingerprint may be the activations of an intermediate layer in a neural network trained on a near-exact matching task.

In some implementations, the audio fingerprint generator 140 may provide the audio fingerprint of the hotword utterance to the replay attack engine 150. Specifically, in the illustrated example, the replay attack the audio fingerprint generator 140 may provide the audio fingerprint of the utterance "OK Computer" to the replay attack engine 150.

The replay attack engine 150 may receive the audio fingerprint of the hotword utterance generated by the audio fingerprint generator 140. In some implementations, the replay attack engine may access a hotword fingerprint database 160. The hotword fingerprint database 160 may be a database that stores the most recent, last N, or all hotword utterances associated with a particular device, or with a particular user, or both. The most recent hotword utterances may be determined according to a particular period of time. The hotword fingerprint database 160 may be a database that stores a particular subset of hotword utterances, for example, those most likely to be susceptible to replay attacks. For example, the hotword fingerprint database 160 may store hotword utterances that were made in public places, e.g., based on location, background noise, or the like, or any combination thereof, or that were made outside of a trusted environment, e.g., the user's home, car, office, or the like. The hotword fingerprint database 160 may store the most recent, last N, or all hotword utterances of the particular subset of hotword utterances.

The replay attack engine 150 may compare the audio fingerprint of the hotword utterance generated by the audio fingerprint generator 140 to the hotword fingerprints stored in the hotword fingerprint database 160. By comparing the audio fingerprint of the hotword utterance generated by the audio fingerprint generator 140 to the hotword fingerprints stored in the hotword fingerprint database 160, the replay attack engine 150 may determine whether the hotword utterance generated by the audio fingerprint generator 140 matches one or more of the hotword fingerprints stored in the hotword fingerprint database 160.

A pair of fingerprints may be determined to match by comparing the fingerprint or features at all pairs of times x and y in the two utterances, i.e., the received hotword utterance and each of the stored hotword utterances. For example, fingerprints may be compared using a similarity function, such as L2 similarity, or using a measure of overlap of the triple descriptors, or using a measure of overlap of the interest points and other derived features. The similarity function may be used to generate a graphical heatmap. A match may be detected based upon a strong similarity along a diagonal line in the heatmap. The line may be shifted vertically or horizontally to allow for a variable start offset at which the match begins. The strength of the similarity may be detected by aggregating similarity scores for all (x-y). A strong peak in the resulting histogram indicates a match between the two at some shift. The peak in the histogram may also have a wide peak if the utterance has been time stretched. Alternatively, the heatmap may be provided as input to a classifier, which may determine whether the pair of fingerprints match. In any case, the replay attack engine 150 may determine a match based on a predetermined similarity threshold being satisfied. For example, the replay attack engine 150 may generate a similarity score or value, and may determine whether the similarity score or value satisfies a predetermined threshold score or value.

In some implementations, the replay attack engine 150 determining that the audio fingerprint of the hotword utterance generated by the audio fingerprint generator 140 matches a hotword fingerprint stored in the hotword fingerprint database 160 indicates a replay attack. In particular, the audio fingerprint of the utterance "OK Computer" generated by the audio fingerprint generator 140 matching an audio fingerprint stored in the hotword fingerprint database 160 indicates that the same utterance of "OK Computer" was previously received and is being replayed in an attempt to access or use the device by an unauthorized user.

In response to determining that the audio fingerprint of the hotword utterance generated by the audio fingerprint generator 140 matches a hotword fingerprint stored in the hotword fingerprint database 160, the replay attack engine may output a signal that prevents the device from being unlocked, locks the device, disables access to the device, initiates a secondary authentication process, or the like. In response to determining that the audio fingerprint of the hotword utterance generated by the audio fingerprint generator 140 does not match a hotword fingerprint stored in the hotword fingerprint database 160, the replay attack engine may output a signal that allows an action to be executed on the device.

Figure 2A:
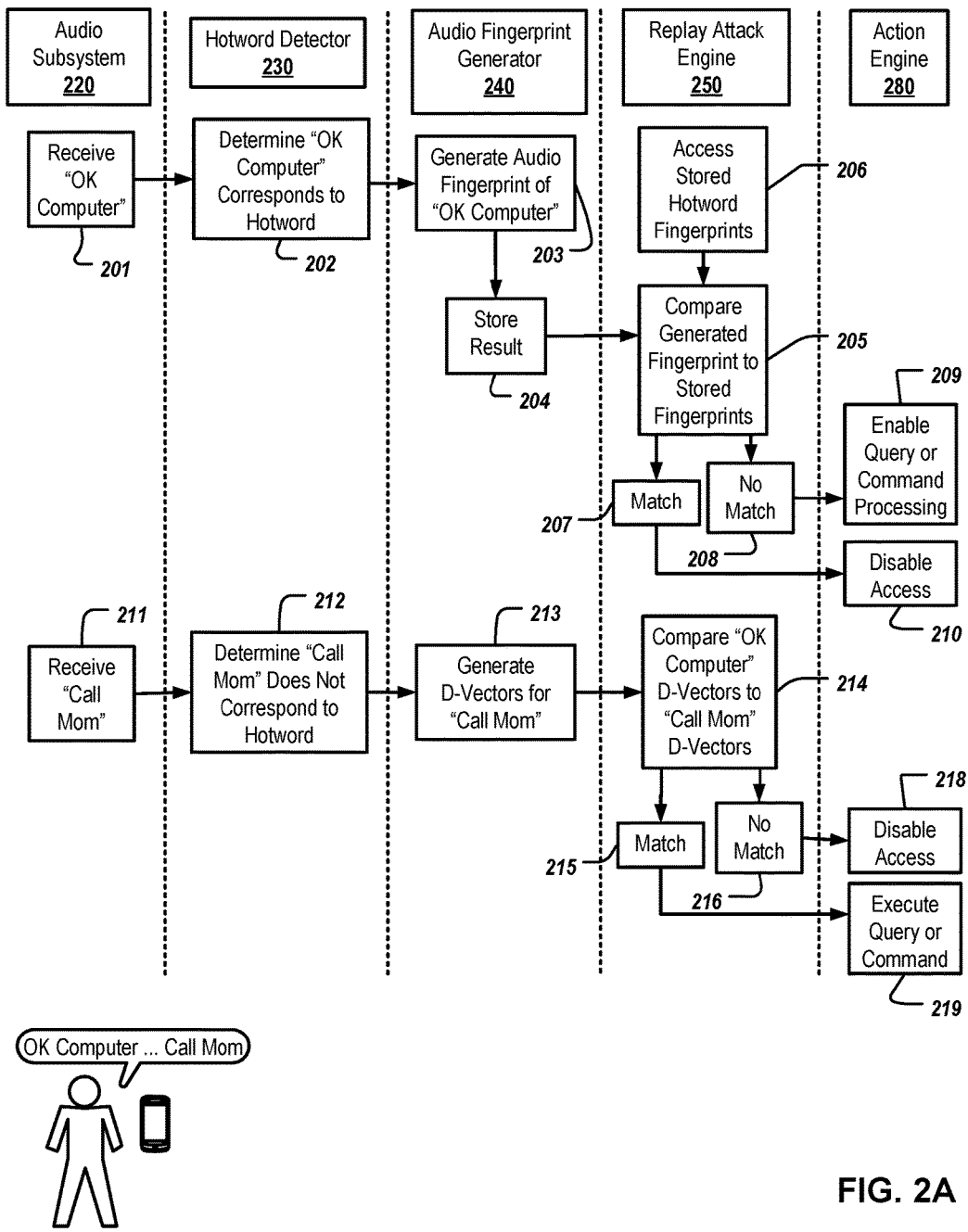
FIGS. 2A and 2B depict diagrams of example processes for detecting and verifying a hotword, according to implementations of the invention.

FIG. 2A depicts a diagram of example processes for detecting and verifying a hotword, according to implementations of the invention. The diagram shows states 201 to 219, which may or may not be illustrated in particular sequence.

At 201, the audio subsystem 220 may receive audio data corresponding to the portion of the utterance "OK Computer." The audio subsystem 220 may process the received audio data corresponding to the utterance "OK Computer" and provide the audio data to the hotword detector 230. At 202, the hotword detector 230 may receive audio data corresponding to the utterance "OK Computer" and determine whether the utterance "OK Computer" corresponds to a hotword for the device, for example, based on the comparing of acoustic features as described above.

If the hotword detector 230 determines that the received utterance does not correspond to a hotword for the device, the hotword detector 230 may provide a signal indicating that a hotword has not been received, and the process may restart with the audio subsystem 220 listening for an utterance. However, in response to the hotword detector 230 determining that the utterance "OK Computer" corresponds to a hotword for the device, the audio fingerprint generator 240 may generate an audio fingerprint of the utterance "OK Computer" at 203. The audio fingerprint of the utterance "OK Computer" that is generated by the audio fingerprint generator 240 may be stored at 204.

At 205, the replay attack engine 250 may receive the audio fingerprint of the utterance "OK Computer" generated by the audio fingerprint generator 240, and compare the generated audio fingerprint to hotword fingerprints that are stored, for example, in a database. In particular, the replay attack engine 250 may access stored hotword fingerprints at 206 for making the comparison with the audio fingerprint of the utterance "OK Computer" generated by the audio fingerprint generator 240.

If the replay attack engine 150 determines no match 208 between the audio fingerprint of the utterance "OK Computer" generated by the audio fingerprint generator 240 and one or more of the stored hotword fingerprints, then access to the device may be granted or processing of a query or command that follows the hotword may be enabled at 209. If the replay attack engine 150 determines a match 207 between the audio fingerprint of the utterance "OK Computer" generated by the audio fingerprint generator 240 and one or more of the stored hotword fingerprints, then access to the device may be disabled or limited at 210 or the device may be prevented from unlocking, or waking, or the like.

In some implementations, since the hotword utterance may be followed by a query or command utterance, whether the d-vectors extracted from the hotword utterance approximately match the d-vectors extracted from the query or command utterance may be determined. The comparison between the hotword utterance and the query or command utterance may inhibit an unauthorized user's ability to replay a recorded hotword and issue a new query or command with their own voice.

At 211, the audio subsystem 220 may receive a query or command utterance that follows the utterance of the hotword. In the illustrated example, the audio subsystem 220 may receive the command utterance "Call Mom" after the hotword utterance "OK Computer". The audio subsystem 220 may process the received audio data corresponding to the utterance "Call Mom" and provide the audio data to the hotword detector 230.

At 212, the hotword detector 230 may receive audio data corresponding to the utterance "Call Mom" and determine whether the utterance "Call Mom" corresponds to a hotword for the device, for example, based on the comparing of acoustic features as described above. In the illustrated example, the hotword detector 230 may determine that the utterance "Call Mom" does not correspond to a hotword. If the hotword detector 230 determines that the received utterance does not correspond to a hotword for the device, the hotword detector 230 may provide a signal indicating that a hotword has not been received.

In some implementations, when it is determined that a hotword has not been received, it may be determined that a query or command is received. For example, in response to determining that a hotword has been received and verifying that there is no match with a stored hotword previously received, query or command processing may be enabled for an utterance the follows the hotword utterance. In the illustrated example, the audio fingerprint generator 240 may generate an audio fingerprint of the utterance "Call Mom" at 213.

In some implementations, the audio fingerprint of the query or command may be used to perform cross-utterance verification of the hotword. In particular, at 214, the replay attack engine 250 may receive speaker-identification d-vectors generated from the utterance "Call Mom", and compare the generated speaker-identification d-vectors of the utterance "Call Mom" to generated hotword d-vectors of the utterance "OK Computer". In some implementations, the replay attack engine 250 may compare the speaker-identification d-vectors of the utterance "Call Mom" to hotword d-vectors of the utterance "OK Computer" that are stored, for example, in a database.

If the replay attack engine 150 determines a match 215 between the audio data corresponding to the utterance "OK Computer" and the audio data corresponding to the utterance "Call Mom", then access to the device may be granted or processing of a query or command that follows the hotword may be executed at 219. If the replay attack engine 150 determines no match 208 between the audio data corresponding to the utterance "OK Computer" and the audio data corresponding to the utterance "Call Mom", then, at

218, the query or command may not be executed, access to the device may be disabled or limited, a secondary authentication process may be initiated, or the device may be prevented from unlocking, or waking, or the like, or any combination thereof. Alternatively, in a similar process, the audio data corresponding to the hotword utterance may be compared to any prior utterance received and stored.

As described above, the replay attack engine 150 may generate a similarity score or value for the comparison of the generated audio fingerprint of the utterance "Call Mom" to the generated hotword fingerprint of the utterance "OK Computer", and may determine whether the similarity score or value satisfies a predetermined threshold score or value. In some implementations, the context of the query or command may be determined. The determined context of the query or command may be used, for example, to weight the similarity score or value or to adjust the predetermined threshold score or value.

For example, if the context of the command or query indicates a lower level of sensitivity with regards to personal or private data, then the similarity score or value may be weighted or the predetermined threshold score or value may be adjusted to more often allow the query or command to be executed regardless of a close similarity between the generated audio fingerprint of the utterance "Call Mom" and the generated hotword fingerprint of the utterance "OK Computer". Conversely, if the context of the command or query indicates a higher level of sensitivity, then the similarity score or value may be weighted or the predetermined threshold score or value may be adjusted to less often allow the query or command to be executed, e.g., requiring a closer similarity between the generated audio fingerprint of the utterance "Call Mom" and the generated hotword fingerprint of the utterance "OK Computer". Thus, the comparison between the hotword utterance and the query or command utterance may inhibit an unauthorized user's ability to replay a recorded hotword and issue a new query or command with their own voice A partial hotword may be detected, for example, as described in U.S. Pat. No. 8,768,712 B1, which is incorporate herein by reference; and more specifically, the process of FIG. 3, some of the details of which are depicted in FIG. 2A, each of which is incorporated herein by reference. In some implementations, after detecting a partial hotword, or during an utterance that follows the hotword, the device may output a unique ultrasonic audio clip, e.g., using frequency-shift keying, which may encode a unique token for recognition. If a previous token is recognized as part of the hotword, the hotword may be rejected. A unique set of frequencies may be used to encode each token so that the token may be detected when the device is outputting a new token. Alternatively, instead of the device detecting an encoded token, the device may detect any significant ultrasound audio other than in the frequency bands the device is using for the new token. If any significant ultrasound audio is detected, the hotword may be rejected.

For example, as depicted in FIG. 1, the hotword detector 130 may comprise a partial hotword detector 135. In addition, the audio subsystem 120 may comprise an ultrasonic audio subsystem 125. The ultrasonic audio subsystem 125 may be configured to output the unique ultrasonic audio clip. The ultrasonic audio subsystem 125 may be configured to receive and process ultrasonic audio samples.

Figure 2B:
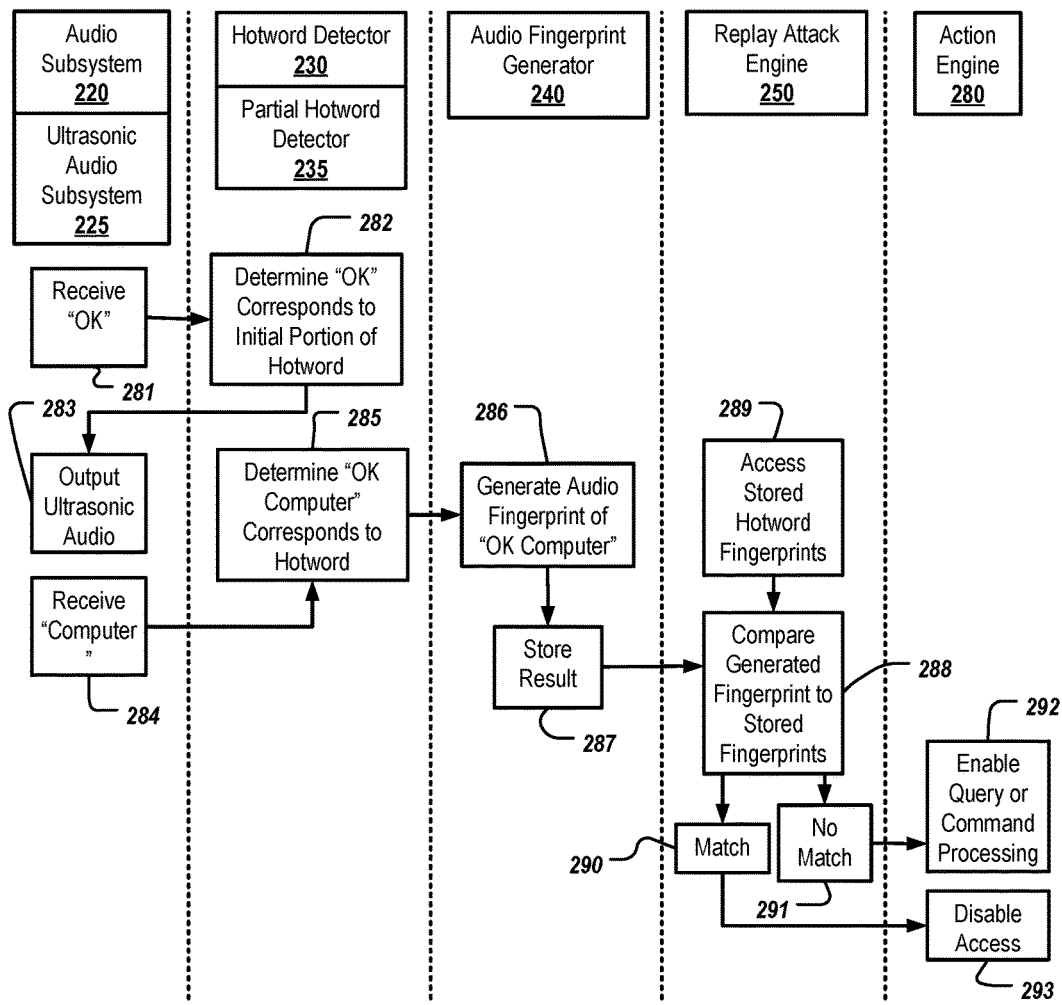
Figure 2B:
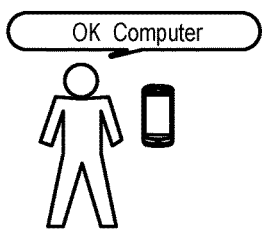

FIG. 2B depicts a diagram of example processes for detecting and verifying a hotword, according to implementations of the invention. For example, as depicted in FIG. 2B, the audio subsystem 220 may receive the initial portion of the audio data associated with the utterance "OK" at 281. The initial portion of the audio data can include a first few audio frames of the utterance, or a first few hundred milliseconds of audio data associated with the utterance. In some examples, the audio subsystem 220 processes the utterance to generate waveform data that includes a portion of the utterance, or substantially a whole portion of the utterance. The audio subsystem 220 may identify one or more acoustic features of the initial portion of the audio data. In the illustrated example, the audio subsystem 220 may identify acoustic features associated with the initial portion of the audio data associated with the utterance "OK."

In the illustrated example, the hotword detector 230 initially receives the processed audio data associated with the utterance "OK," e.g., an initial portion of the audio data. The hotword detector 230 may determine that the received audio data corresponds to an initial portion of a hotword. Specifically, the hotword detector 230 includes the partial hotword detector 225. The partial hotword detector 225 may determine that the initial portion of the audio data corresponds to an initial portion of a hotword. In the illustrated example, the partial hotword detector 225 may determine that the initial portion of the audio data associated with the utterance "OK" corresponds to an initial portion of a hotword "OK Computer." In some implementations, the initial portion of a hotword includes less than the entire hotword. For example, the initial portion "OK" is less than the entire hotword "OK Computer." The partial hotword detector 225 may compare the acoustic features of the initial portion of the audio data associated with the utterance "OK" to acoustic features associated with one or more hotwords stored in a database.

Based on the comparing of acoustic features, the initial portion of the audio data associated with the utterance "OK" may be determined to correspond to an initial portion of a hotword stored in the database. For example, the hotword detector 230 may determine that the acoustic features of the initial portion of the audio data associated with the utterance "OK" corresponds to an initial portion of a hotword "OK Computer" at 282, based on the comparison of the acoustic features of the utterance "OK" and the acoustic features of the hotword "OK Computer."

In some implementations, in response to initial portion of the audio data associated with the utterance being determined to correspond to an initial portion of a hotword, the ultrasonic audio subsystem 225 may output unique ultrasonic audio clip at 283. In some implementations, the ultrasonic audio subsystem 225 may output the unique ultrasonic audio clip after the full hotword has been received.

At 284, the audio subsystem 220 may receive audio data corresponding to the portion of the utterance "Computer." The audio subsystem 220 may process the received audio data corresponding to the utterance "Computer" and provide the audio data to the hotword detector 230. At 285, the hotword detector 230 may receive audio data corresponding to the utterance "Computer" in addition to the audio data previously received corresponding to the utterance "OK" and determine whether the utterance "OK Computer" corresponds to a hotword for the device, for example, based on the comparing of acoustic features as described above.

If the hotword detector 230 determines that the received utterance does not correspond to a hotword for the device, the hotword detector 230 may provide a signal indicating that a hotword has not been received, and the process may restart with the audio subsystem 220 listening for an utterance. However, in response to the hotword detector 230 determining that the utterance "OK Computer" corresponds to a hotword for the device, the audio fingerprint generator 240 may generate an audio fingerprint of the utterance "OK Computer" at 286. The audio fingerprint of the utterance "OK Computer" that is generated by the audio fingerprint generator 240 may be stored at 287.

At 288, the replay attack engine 250 may receive the audio fingerprint of the utterance "OK Computer" generated by the audio fingerprint generator 240, and compare the generated audio fingerprint to hotword fingerprints that are stored, for example, in a database. In particular, the replay attack engine 250 may access stored hotword fingerprints at 289 for making the comparison with the audio fingerprint of the utterance "OK Computer" generated by the audio fingerprint generator 240.

If the replay attack engine 150 determines no match 291 between the audio fingerprint of the utterance "OK Computer" generated by the audio fingerprint generator 240 and one or more of the stored hotword fingerprints, then access to the device may be granted or processing of a query or command that follows the hotword may be enabled at 292. If the replay attack engine 150 determines a match 290 between the audio fingerprint of the utterance "OK Computer" generated by the audio fingerprint generator 240 and one or more of the stored hotword fingerprints, then access to the device may be disabled or limited at 293 or the device may be prevented from unlocking, or waking, or the like.

Thus, according to implementations of the disclosure, hotword or any speech-based replay attacks may be inhibited by verifying the uniqueness of each utterance. In particular, the most recent, last N, or all hotword utterances that were recognized by a particular device or by a particular user may be recorded and stored. An audio fingerprint may be generated and stored for each hotword utterance, and a comparison may be performed between the audio fingerprint generated from a new utterance with each previously recorded audio fingerprint to check whether the same utterance audio has been previously used, indicating a replay. For example, when a hotword is recognized, an audio fingerprint of the hotword utterance may be generated and the derived fingerprint may be compared against fingerprints from previous utterances of the hotword. If a match is determined, the utterance may have been previously used, indicating a likely replay, and may be rejected. In response to the utterance being rejected, additional actions may be taken, e.g., blocking the device, alerting the device owner, displaying a warning, or the like, or any combination thereof. In addition, in certain implementations, other signals, e.g., ultrasonic audio injection and cross-utterance verification, may be used to further limit the effectiveness of replay attacks.

Figure 3:
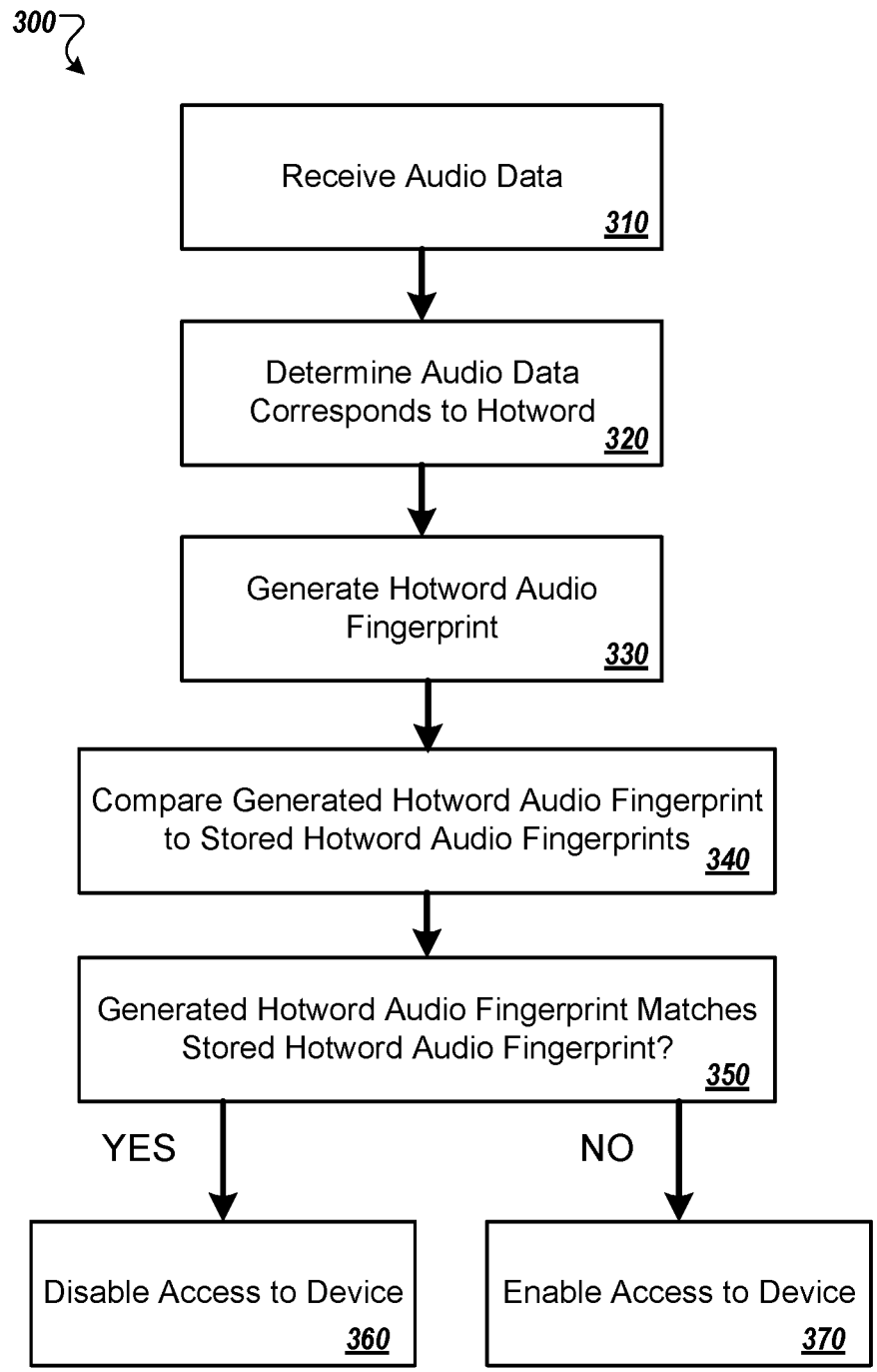
FIG. 3 depicts an example flowchart for detecting and verifying a hotword, according to implementations of the invention.

FIG. 3 depicts an example flowchart for detecting and verifying a hotword, according to implementations of the invention. As depicted in FIG. 3, the process 300 may comprise receiving audio data corresponding to an utterance at 310. The received audio data may be processed and then used to determine whether the audio data associated with the utterance corresponds to a hotword at 320. For example, a comparison may be made between audio characteristics of the received utterance and audio characteristics of a hotword utterance for the device. In particular, a sequence of vectors may be generated from the received audio data corresponding to an utterance, and the sequence of vectors may be compared to vectors of an utterance of the hotword associated with the device.

At 330, an audio fingerprint may be generated for the received utterance. For example, the audio data corresponding to the received utterance may be used to generate or compute a hotword audio fingerprint of the received hotword utterance. At 340, the hotword audio fingerprint may be compared to stored hotword audio fingerprints. For example, a database of stored hotword audio fingerprints may be accessed and the hotword audio fingerprint may be compared to the stored hotword audio fingerprints, e.g., determining a similarity between the generated hotword audio fingerprint and each of the stored hotword audio fingerprints.

The comparison between the generated hotword audio fingerprint and the stored hotword audio fingerprints may be used to determine if a match exists between any of the stored hotword audio fingerprints and the generated hotword audio fingerprint at 350. For example, it may be determined whether a similarity between the generated hotword audio fingerprint and one or more of the stored hotword audio fingerprints satisfies a predetermined threshold.

If it is determined that the generated hotword audio fingerprint matches one or more of the stored hotword audio fingerprints ("YES"), then access to the device may be disabled or prevented at 360. For example, a match may indicate that an unauthorized user is replaying recorded audio of a hotword previously uttered by an authorized user in an attempt to gain unauthorized access to the device.

If it is determined that the generated hotword audio fingerprint does not match one or more of the stored hotword audio fingerprints ("NO"), then access to the device may be enabled or an action may be executed at 370. For example, a determination that there is no match may indicate that the utterance is a new unique utterance of the hotword and is not a replay of recorded audio of a hotword previously uttered by the authorized user.

According to implementations of the disclosure, the hotword detection and speaker verification may be performed in either hardware or software or in a combination of both hardware and software. The fingerprint-based hotword verification may be applied at the level of a single device, or across multiple devices.

If hotword verification is applied at the level of a single device, the set of fingerprints from previous utterances may be stored locally on the device. If the set of fingerprints from previous utterances are stored locally on the device, the fingerprinting and matching process and functions may occur after hotword detection, e.g., on the device's digital signal processor, before waking the device.

Figure 4:
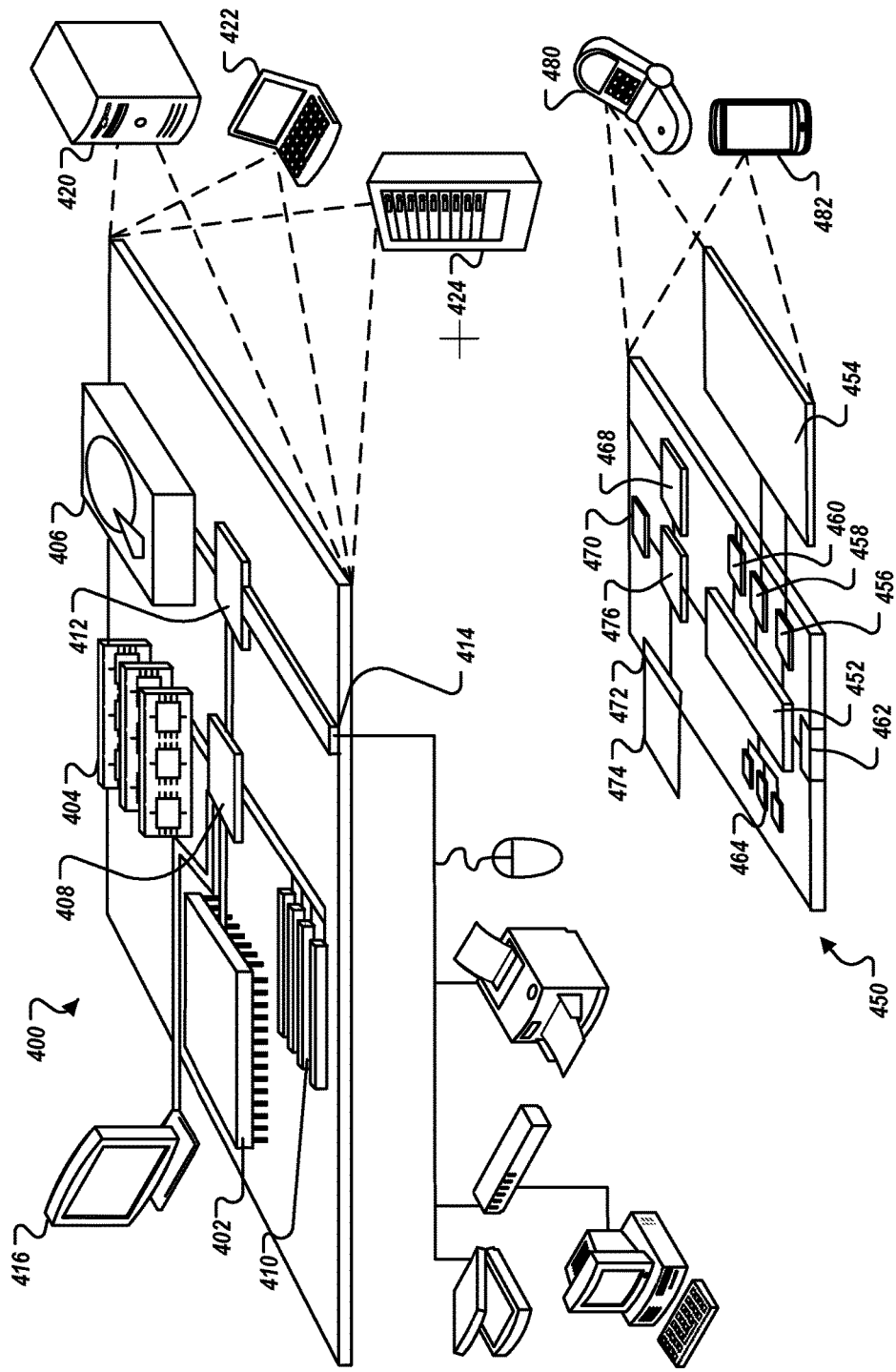
FIG. 4 depicts a computer device and a mobile computer device that may be used to implement the techniques described here.

If hotword verification is applied across multiple devices, the set of fingerprints from previous utterances may be stored on a server. If the set of fingerprints from previous utterances is stored on a server, the hotword may wake the device and the hotword utterance, or the audio fingerprint of the hotword utterance, may be sent to the same server that is used to perform recognition of the subsequent query or command. The server may verify the uniqueness of the hotword utterance, and may return a status that indicates whether the query or command should be allowed or should be rejected. Alternatively, if hotword verification is applied across multiple devices, the set of fingerprints from previous utterances may be synced across the multiple devices to enable the verification to be performed on the client device FIG. 4 shows an example of a generic computer device 400 and a generic mobile computer device 450, which may be used with the techniques described here. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 may process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a volatile memory unit or units. In another implementation, the memory 404 is a non-volatile memory unit or units. The memory 404 may also be another form of computer-readable medium, such as a magnetic or optical disk.

The storage device 406 is capable of providing mass storage for the computing device 400. In one implementation, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product may be tangibly embodied in an information carrier. The computer program product may also contain instructions that, when executed, perform one or more methods, such as those described above. The information carrier is a computer- or machine-readable medium, such as the memory 404, the storage device 406, or a memory on processor 402.

The high speed controller 408 manages bandwidth-intensive operations for the computing device 400, while the low speed controller 412 manages lower bandwidth-intensive operations. Such allocation of functions is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 may execute instructions within the computing device 640, including instructions stored in the memory 464. The processor may be implemented as a chipset of chips that include separate and multiple analog and digital processors. The processor may provide, for example, for coordination of the other components of the device 450, such as control of user interfaces, applications run by device 450, and wireless communication by device 450.

Processor 452 may communicate with a user through control interface 648 and display interface 456 coupled to a display 454. The display 454 may be, for example, a TFT LCD (Thin-Film-Transistor Liquid Crystal Display) or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provide in communication with processor 452, so as to enable near area communication of device 450 with other devices. External interface 462 may provide, for example, for wired communication in some implementations, or for wireless communication in other implementations, and multiple interfaces may also be used.

The memory 464 stores information within the computing device 450. The memory 464 may be implemented as one or more of a computer-readable medium or media, a volatile memory unit or units, or a non-volatile memory unit or units. Expansion memory 454 may also be provided and connected to device 450 through expansion interface 452, which may include, for example, a SIMM (Single In Line Memory Module) card interface. Such expansion memory 454 may provide extra storage space for device 450, or may also store applications or other information for device 450. Specifically, expansion memory 454 may include instructions to carry out or supplement the processes described above, and may include secure information also. Thus, for example, expansion memory 454 may be provide as a security module for device 450, and may be programmed with instructions that permit secure use of device 450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 454, memory on processor 452, or a propagated signal that may be received, for example, over transceiver 468 or external interface 462.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS (Global Positioning System) receiver module 450 may provide additional navigation- and location-related wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

A number of implementations have been described. Nevertheless, it will be understood that various modifications may be made without departing from the spirit and scope of the disclosure. For example, various forms of the flows shown above may be used, with steps re-ordered, added, or removed.

Implementations of the invention and all of the functional operations described in this specification can be implemented in digital electronic circuitry, or in computer software, firmware, or hardware, including the structures disclosed in this specification and their structural equivalents, or in combinations of one or more of them. Implementations of the invention can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this disclosure contains many specifics, these should not be construed as limitations on the scope of the invention or of what may be claimed, but rather as descriptions of features specific to particular implementations of the invention. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

Thus, particular implementations of the present disclosure have been described. Other implementations are within the scope of the following claims. For example, the actions recited in the claims can be performed in a different order and still achieve desirable results. A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method comprising:
receiving, by a hotword detector of a mobile computing device that includes (a) the hotword detector, (b) an ultrasonic audio subsystem, and (c) a replay attack engine and that is (i) operating in a mode in which access to one or more resources is disabled, and (ii) configured to exit the mode in which access to the one or more resources is disabled upon detecting an utterance of a hotword, an initial audio input corresponding to an utterance of an initial portion of a hotword;
while a remaining portion of the hotword is being uttered and before the hotword is fully uttered, providing, by the ultrasonic audio subsystem of the mobile computing device, verification audio for output through a speaker of the mobile computing device; and
selectively exiting, by the replay attack engine of the mobile computing device, the mode in which access to the one or more resources is disabled after the hotword is fully uttered.

2. The computer-implemented method of claim 1, wherein the verification audio comprises one of a plurality of unique ultrasonic audio samples.

3. The computer-implemented method of claim 1, wherein the hotword is a particular term that triggers semantic interpretation of an additional term of one or more terms that follow the particular term.

4. The computer-implemented method of claim 1, further comprising:
receiving, by the mobile computing device, an additional audio input corresponding to an utterance of the remaining portion of a hotword;
determining that one of either the initial audio input corresponding to an utterance of an initial portion of a hotword or the additional audio input corresponding to an utterance of the remaining portion of a hotword comprises audio data corresponding to verification audio different than the verification audio provided for output through the speaker of the mobile computing device; and disabling access to one or more resources of the mobile computing device.

5. The computer-implemented method of claim 4, wherein disabling access to one or more resources of the mobile computing device comprises one or more of: preventing the mobile computing device from being unlocked, locking the mobile computing device, initiating an authentication process, and preventing the mobile computing device from waking.

6. The computer-implemented method of claim 1, further comprising:
   receiving, by the mobile computing device, an additional audio input corresponding to an utterance of the remaining portion of a hotword;
   determining that the initial audio input corresponding to an utterance of an initial portion of a hotword and the additional audio input corresponding to an utterance of the remaining portion of a hotword, collectively, correspond to the entire hotword,
   wherein selectively exiting the mode is based at least in part on determining that the initial audio input corresponding to an utterance of an initial portion of a hotword and the additional audio input corresponding to an utterance of the remaining portion of a hotword, collectively, correspond to the entire hotword.

7. The computer-implemented method of claim 1, wherein the verification audio is stored in a database in association with the initial audio input corresponding to an utterance of an initial portion of a hotword.

8. A system comprising one or more computers and one or more storage devices storing instructions that are operable, when executed by the one or more computers, to cause the one or more computers to perform operations comprising:
   receiving, by a hotword detector of a mobile computing device that includes (a) the hotword detector, (b) an ultrasonic audio subsystem, and (c) a replay attack engine and that is (i) operating in a mode in which access to one or more resources is disabled, and (ii) configured to exit the mode in which access to the one or more resources is disabled upon detecting an utterance of a hotword, an initial audio input corresponding to an utterance of an initial portion of a hotword;
   while a remaining portion of the hotword is being uttered and before the hotword is fully uttered, providing, by the ultrasonic audio subsystem of the mobile computing device, verification audio for output through a speaker of the mobile computing device; and
   selectively exiting, by the replay attack engine of the mobile computing device, the mode in which access to the one or more resources is disabled after the hotword is fully uttered.

9. The system of claim 8, wherein the verification audio comprises one of a plurality of unique ultrasonic audio samples.

10. The system of claim 8, wherein the hotword is a particular term that triggers semantic interpretation of an additional term of one or more terms that follow the particular term.

11. The system of claim 8, the operations further comprising:
   receiving, by the mobile computing device, an additional audio input corresponding to an utterance of the remaining portion of a hotword;
   determining that one of either the initial audio input corresponding to an utterance of an initial portion of a hotword or the additional audio input corresponding to an utterance of the remaining portion of a hotword comprises audio data corresponding to verification audio different than the verification audio provided for output through the speaker of the mobile computing device; and
   disabling access to one or more resources of the mobile computing device.

12. The system of claim 11, wherein disabling access to one or more resources of the mobile computing device comprises one or more of: preventing the mobile computing device from being unlocked, locking the mobile computing device, initiating an authentication process, and preventing the mobile computing device from waking.

13. The system of claim 8, the operations further comprising:
   receiving, by the mobile computing device, an additional audio input corresponding to an utterance of the remaining portion of a hotword;
   determining that the initial audio input corresponding to an utterance of an initial portion of a hotword and the additional audio input corresponding to an utterance of the remaining portion of a hotword, collectively, correspond to the entire hotword,
   wherein selectively exiting the mode is based at least in part on determining that the initial audio input corresponding to an utterance of an initial portion of a hotword and the additional audio input corresponding to an utterance of the remaining portion of a hotword, collectively, correspond to the entire hotword.

14. The system of claim 8, wherein the verification audio is stored in a database in association with the initial audio input corresponding to an utterance of an initial portion of a hotword.

15. A computer-readable storage device storing software comprising instructions executable by one or more computers which, upon such execution, cause the one or more computers to perform operations comprising:
   receiving, by a hotword detector of a mobile computing device that includes (a) the hotword detector, (b) an ultrasonic audio subsystem, and (c) a replay attack engine and that is (i) operating in a mode in which access to one or more resources is disabled, and (ii) configured to exit the mode in which access to the one or more resources is disabled upon detecting an utterance of a hotword, an initial audio input corresponding to an utterance of an initial portion of a hotword;
   while a remaining portion of the hotword is being uttered and before the hotword is fully uttered, providing, by the ultrasonic audio subsystem of the mobile computing device, verification audio for output through a speaker of the mobile computing device; and
   selectively exiting, by the replay attack engine of the mobile computing device, the mode in which access to the one or more resources is disabled after the hotword is fully uttered.

16. The computer-readable storage device of claim 15, wherein the verification audio comprises one of a plurality of unique ultrasonic audio samples.

17. The computer-readable storage device of claim 15, wherein the hotword is a particular term that triggers semantic interpretation of an additional term of one or more terms that follow the particular term.

18. The computer-readable storage device of claim 15, the operations further comprising:
   receiving, by the mobile computing device, an additional audio input corresponding to an utterance of the remaining portion of a hotword;

determining that one of either the initial audio input corresponding to an utterance of an initial portion of a hotword or the additional audio input corresponding to an utterance of the remaining portion of a hotword comprises audio data corresponding to verification audio different than the verification audio provided for output through the speaker of the mobile computing device; and disabling access to one or more resources of the mobile computing device.

19. The computer-readable storage device of claim 18, wherein disabling access to one or more resources of the mobile computing device comprises one or more of: preventing the mobile computing device from being unlocked, locking the mobile computing device, initiating an authentication process, and preventing the mobile computing device from waking.

20. The computer-readable storage device of claim 15, the operations further comprising:

receiving, by the mobile computing device, an additional audio input corresponding to an utterance of the remaining portion of a hotword;

determining that the initial audio input corresponding to an utterance of an initial portion of a hotword and the additional audio input corresponding to an utterance of the remaining portion of a hotword, collectively, correspond to the entire hotword, wherein selectively exiting the mode is based at least in part on determining that the initial audio input corresponding to an utterance of an initial portion of a hotword and the additional audio input corresponding to an utterance of the remaining portion of a hotword, collectively, correspond to the entire hotword.

* * * * *